United States Patent [19]
Strohmeyer

[11] Patent Number: 5,243,371
[45] Date of Patent: Sep. 7, 1993

[54] SWING ARM ASSEMBLY FOR THE PROJECTOR HEAD OF AN OVERHEAD PROJECTOR

[75] Inventor: Willi Strohmeyer, Hanover, Fed. Rep. of Germany

[73] Assignee: Geha-Werke GmbH, Hanover, Fed. Rep. of Germany

[21] Appl. No.: 867,839

[22] Filed: Apr. 13, 1992

[30] Foreign Application Priority Data

Apr. 11, 1991 [DE] Fed. Rep. of Germany ........ 4111818

[51] Int. Cl.⁵ .................... G03B 21/30; G03B 21/132
[52] U.S. Cl. ............................. 353/119; 353/DIG. 3
[58] Field of Search ........... 353/119, DIG. 3, DIG. 4, 353/DIG. 6, 63, 65, 100, 101, 66–67

[56] References Cited

U.S. PATENT DOCUMENTS

| | | | |
|---|---|---|---|
| 2,564,057 | 8/1951 | Fitzgerald | 353/DIG. 3 |
| 3,117,320 | 1/1964 | O'Toole | |
| 3,124,035 | 3/1964 | Lucas | 353/119 |
| 3,579,241 | 5/1971 | Antista et al. | |
| 4,795,252 | 1/1989 | Kyhl | 353/122 |
| 4,880,303 | 11/1989 | Grunwald | 353/DIG. 3 |
| 4,968,134 | 11/1990 | Shimizu et al. | 353/DIG. 3 |

FOREIGN PATENT DOCUMENTS

| | | |
|---|---|---|
| 2828245 | 1/1980 | Fed. Rep. of Germany ... 353/DIG. 6 |
| 3205643 | 8/1983 | Fed. Rep. of Germany . |
| 3939246 | 10/1985 | Japan . |
| 2186385 | 8/1987 | United Kingdom . |

OTHER PUBLICATIONS

Japan Abstract, p. 393, vol. 9, #246, Oct. 1985.

*Primary Examiner*—William A. Cuchlinski, Jr.
*Assistant Examiner*—William C. Dowling
*Attorney, Agent, or Firm*—Herbert Dubno

[57] ABSTRACT

An arm carrying the projection head of an overhead projector is swingable mounted on a pivot body received in a guide at one side of the housing of an overhead projector so that the entire pivot can drop into this guide in the operative upright position of the arm. In that position, the segment of the arm adjacent the pivot is locked by the guide in its upright position.

5 Claims, 3 Drawing Sheets 5,243,371

SWING ARM ASSEMBLY FOR THE PROJECTOR HEAD OF AN OVERHEAD PROJECTOR

FIELD OF THE INVENTION

My present invention relates to a swing arm for the projection head of an overhead projector and, more particularly, to an arm assembly of such an overhead projector which has a lock for the pivot by means of which the arm is swingable on the housing of the overhead projector.

BACKGROUND OF THE INVENTION

It is known to provide an overhead projector which has a swingable arm on the base or housing of the projector in which the pivot is exposed at the side of the apparatus above the top of the housing. This pivot, therefore, is always visible. In addition, the pivot must be provided with a locking device actuated by the operator before it permits pivoting of the arm into its horizontal position to collapse the overhead projectors. This lock mechanism is also exposed at the pivot.

Pivots which are exposed pose attractive nuisances for children, create locations which can pose a danger to the user, especially for an inexperienced user, and frequently prevent use of the apparatus in a school or other environment at which the device may be handled by inexperienced operators or juveniles.

Furthermore, the locking mechanism contributes to the cost of the overhead projector and ma make the cost prohibited.

OBJECTS OF THE INVENTION

It is, therefore, the principal object of the present invention to provide an overhead projector with a swingable arm such that the pivot for this arm is not visible or exposed during operation of the projector, which has a simplified locking system for the erect arm and which, in general, is easier to handle and operate than earlier overhead projectors.

Another object of this invention is to provide a swingable arm assembly for the projection head of an overhead projector whereby drawbacks of earlier systems are obviated.

SUMMARY OF THE INVENTION

These objects and others which will become apparent hereinafter are attained, in accordance with the invention in an arm assembly for an overhead projector which comprises:

an overhead projector housing having a pair of opposite sides;

a guide open at one of the sides and extending in the housing;

a pivot body displaceable in the guide and formed with a pivot;

a swingable arm articulated to the body at the pivot and swingable thereon between an upright operative position wherein the body and the pivot are fully received in the guide and recessed below the top of the housing, and an inoperative position wherein the arm lies along a top of the housing, the guide being shaped and dimensioned to lock the arm in the upright position relative to the body upon recessing of the pivot in the guide below the top;

a projection head on the arm at an end thereof remote from the pivot; and abutment means o the guide and the body defining end positions of the body in the guide.

More specifically, the pivot is formed at an upper end of an elongated pivot body which has a cross section complementary to the inner cross section of the vertical guide in which this body is received and in which the body can be lowered until the pivot is recessed below the top of the housing.

The guide has its internal cross section so matched to the outer configuration of the pivot body and the portion of the arm adjoining the pivot that it forms a sleeve-like lock for the pivot in the aligned positions of the arm and the pivot body so that the arm is locked in its erect position. This locking arrangement is of surprising simplicity and does not require manipulation of any mechanism but rather is engaged by simply swinging the arm into its erect position and lowering it with the pivot body in the guide.

In the operative or projection position of the arm, the pivot is fully recessed in the housing. The guide for the pivot in the housing simultaneously forms the locking device for the pivot.

According to a feature of the invention, the guide is a profile body, i.e. has a polygonal, e.g. rectangular, cross section and is open upwardly at the top of the housing or body of the overhead projector. This configuration allows the guide to be of simple cross section and easily integrated into the housing.

The pivot body itself can be elongated and linearly slidable in the guide. The pivot body can thus provide an effective retention of the pivot while nevertheless being received with some play in the guide. Reliable positioning of the swingable arm in its operative or projecting position is assured deposit play in the pivot body.

The abutment means of the present invention can include a pin mounted on the housing body and engaged in a slot formed in the pivot body. The slot has abutment surfaces engaging the pin in the end positions of the abutment body.

It has been found to be advantageous to so damage the length of the pivot arm that, when the arm is swung into the collapsed position of the overhead projector, the projection head will lie along the side of the housing opposite that at which the guide is provided. The projection head is then stored in its inoperative position in a protected position adjacent and laterally of the housing.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
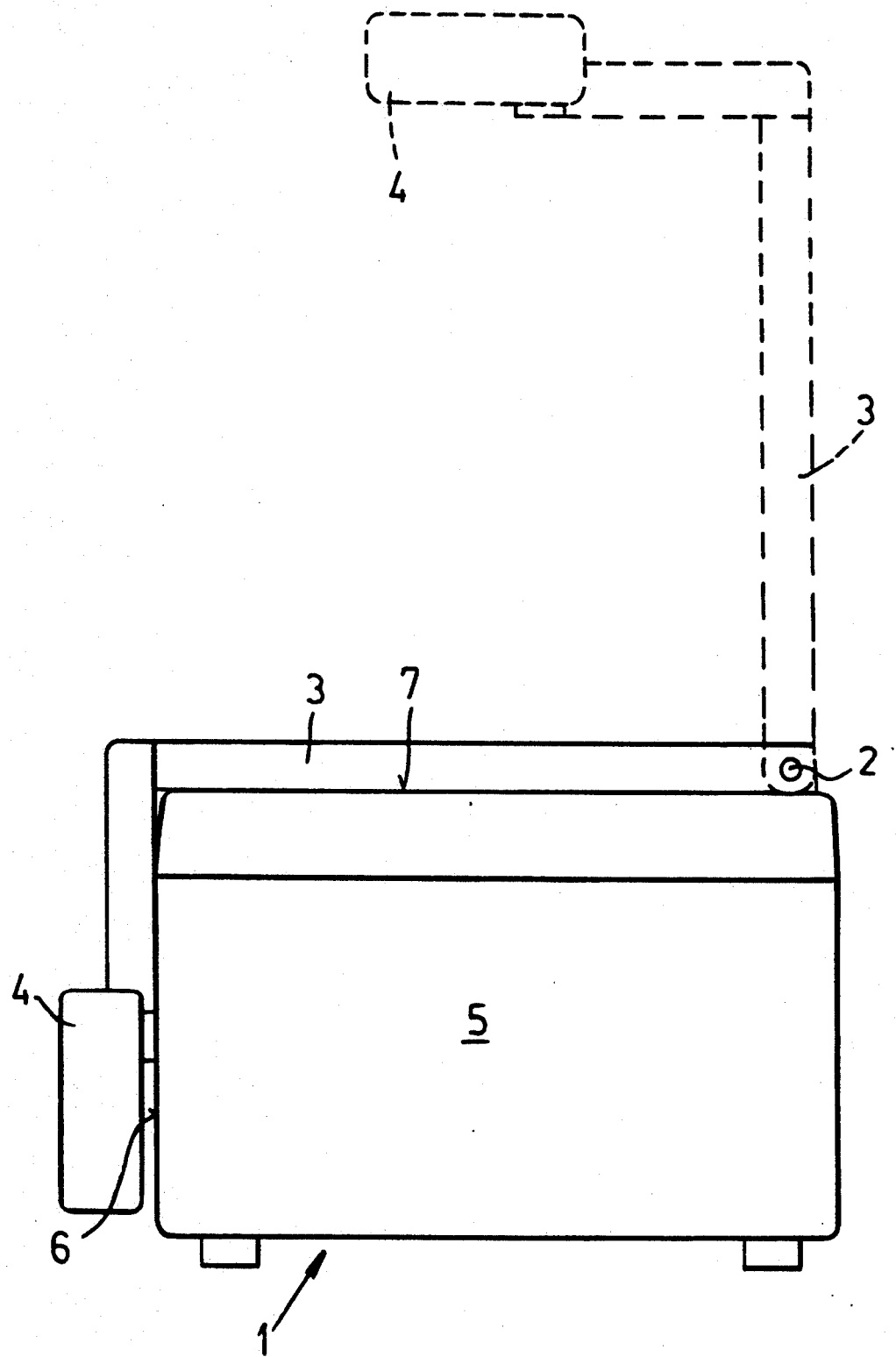
FIG. 1 is a side elevational view of an overhead projector according to the invention.

In FIG. 1 we have shown an overhead projector 1 having a swingable arm 3 connected to a pivot 2 at one end and provided with a projection head 4 at its opposite end. The optics, light source and other standard elements of the overhead projector have not been illustrated.

The swingable arm 3 is shown in its rest or inoperative position in solid lines in FIG. 1. In this position, the head 4 lies adjacent a side 6 of the housing or body 5 of the machine opposite the side at which the pivot 2 is provided. In this position, therefore, the head 4 is protected.

The arm 3 can be swung into the broken line position shown in FIG. 1, the arm being then upright and the head 4 being in its operative position project an image onto a scale or the like remote from the projector. The image cast on this screen is a reproduction of a master deposited upon a receiving surface 7 formed on the top of the housing 5. The transparency can simply be pressed upon the surface 7. The illumination force, the projection optics, etc. are not visible in the drawing and neither is the mirror which normally turns the image from a horizontal position of the master on the surface 7 into a vertical plane.

Figure 2:
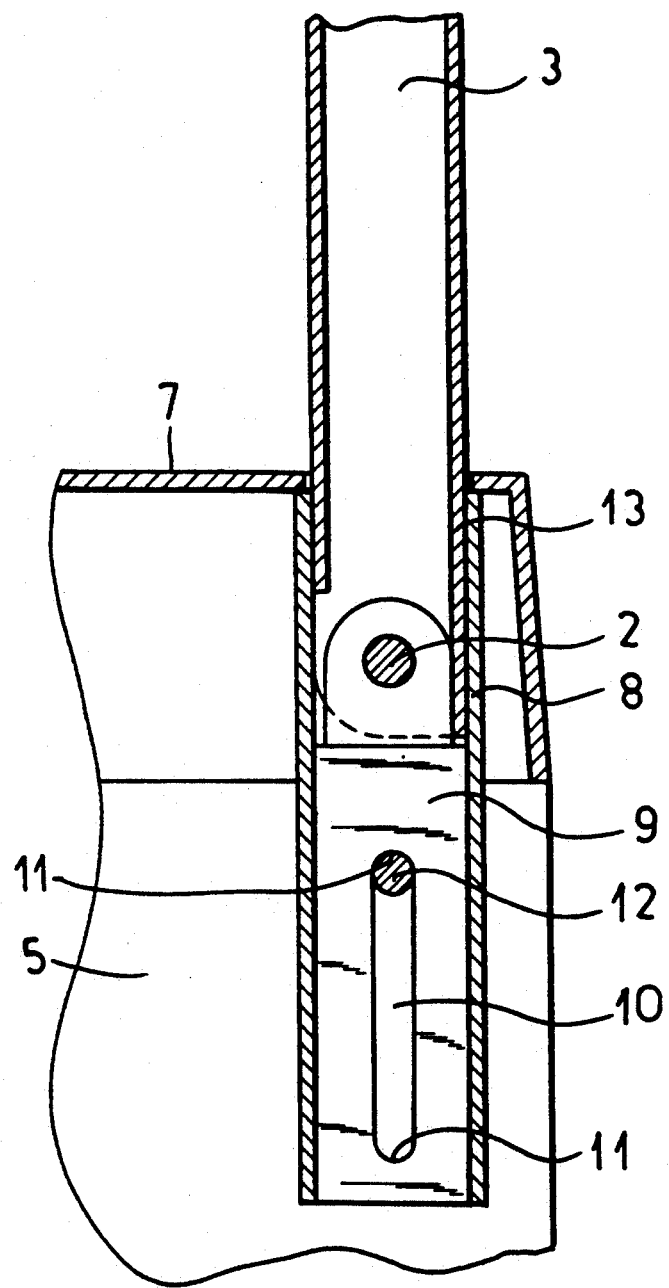
FIG. 2 is a cross sectional view through the housing of the overhead projector in the region of the guide and pivot, showing these parts enlarged in scale by comparison with FIG. 1.

From FIG. 2 it can be seen that within the housing 5, at a side thereof opposite the side 6, an upwardly open guide 8 is mounted. A pivot body 9 is linearly slidable in the guide 8. The pivot body 9 has a slot 10 engaged by a pin 12 mounted on the housing 5 via the guide 8 and engageable with opposite abutment surfaces formed by the opposite ends of the slot. The pin 12 and the surfaces 11 limit the displacement of the pivot body 9 in the guide 8.

Figure 3:
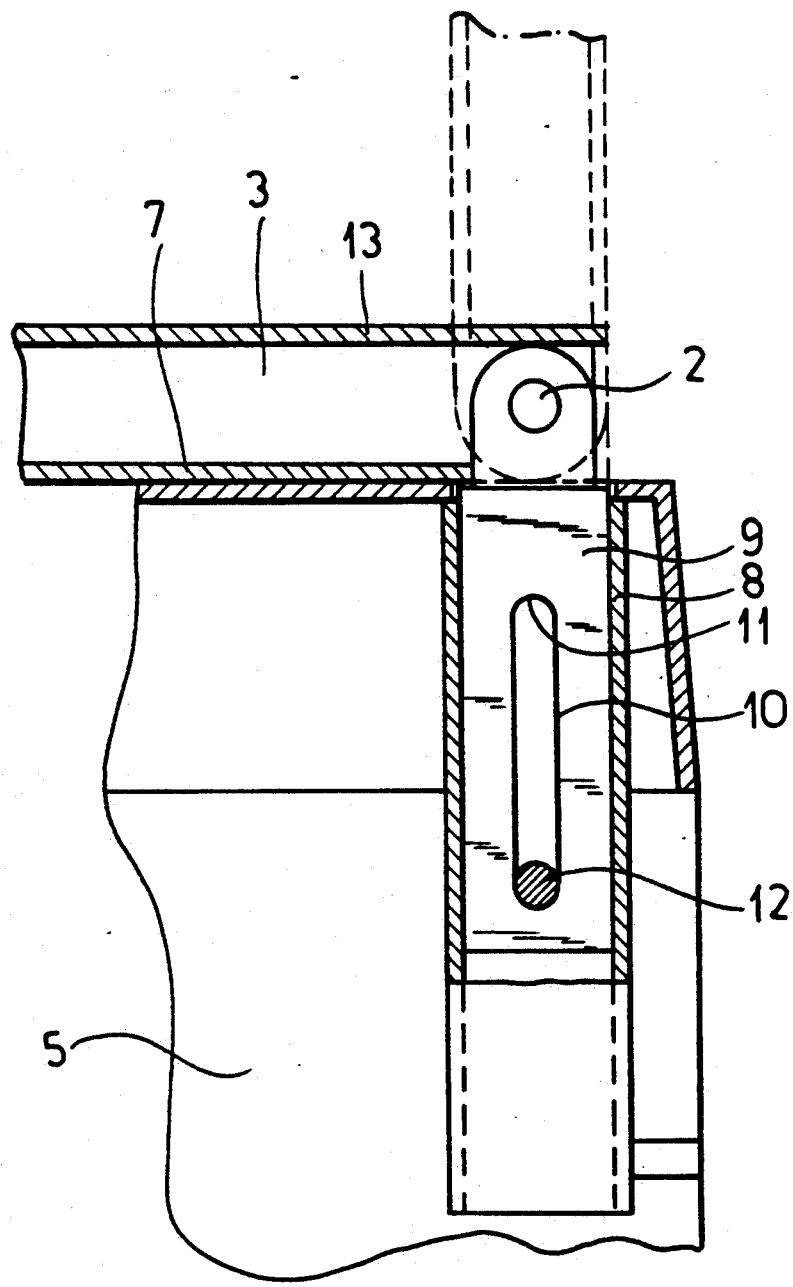
FIG. 3 is a section similar to FIG. 2 showing the arm in its inoperative position.

The swingable arm 3 is connected to the pivot body 9 at the pivot 2 and thus the adjacent portion of the arm 2 can swing between the positions shown in FIGS. 2 and 3. In the position shown in FIG. 2, corresponding to the operative position, the section 13 of the swingable arm 3 adjacent the pivot 2 is received within the guide 8 which forms a sleeve locking the part 13 to the body 9 and thereby securing the arm in the erect position. The guide 8 is matched exactly to the outer dimensions of the section 13 of arm 3 provided with the pivot 2 so that the arm 3 is guided into its operative position and held there.

Since the section 13 of arm 3 carrying the pivot 2 is received in the guide 8 without play, the guide 8 forms the lock as described. If it is desirable to swing arm 3 into its rest or inoperative position, it is merely necessary to lift arm 3 vertically until the pivot 2 is extracted from below the surface 7. This can be effected simply by hand.

Once the pivot 2 emerges from the guide (FIG. 3) the arm 3 can then by swung in a counterclockwise sense about the pivot 2 into its rest position shown in FIG. 3.

It will be apparent that it is not material whether or not the pivot body has play in the guide 8. The locking of the arm 3 is effected by the engagement of the section 13 of the arm by the sleeve 8 and only this section must have its dimensions matched exactly to the guide 8.

If it is desired to return the arm 3 into its operative or upright position, it is only required that this arm be swung in the clockwise sense, upwardly. Its weight will cause the arm to sink with the pivot 2 and the section 13 into the guide 8 once the arm has reached its erect position to lock the pivot 2. Here as well the actuation requires only the manual pivoting of the arm. The movement of the pivot body 9 is limited by the engagement of the upper abutment surface 11 against the pin 12 secured in the guide 8.

In the operative or projecting position (FIG. 2) the pivot 2 is not visible. As a result the appearance of the projector is quite elegant in the operative position thereof and it can be used with great advantage in school where earlier projectors have shown such visible pivots to be drawbacks or nuisances because the pivots can be played with by children. Indeed, in the operative position it is not apparent that the arm is swingable. The device is protected against tampering and accidental damage as well.

I claim:

1. An arm assembly for an overhead projector, comprising:

an overhead projector housing having a pair of opposite sides;

a guide open at one of said sides and extending in said housing;

a pivot body displaceable in said guide and formed with a pivot;

a swingable arm articulated to said body at said pivot and swingable thereon between an upright operative position wherein said body and said pivot are fully received in said guide and recessed below said top of said housing, and an inoperative position wherein said arm lies along a top of said housing, said guide being shaped and dimensioned to lock said arm in said upright position relative to said body upon recessing of said pivot in said guide below said top;

a projection head on said arm at an end thereof remote from said pivot; and abutment means on said guide and said body defining end positions of said body in said guide, said guide extending generally vertically in said housing, being open at said top and being formed as a profile member with a polygonal cross section, said body being elongated and of a cross section complementary to that of said guide, said pivot being formed at an upper end of said body, said body being linearly slidable in said guide, said arm having an outer cross section complementary to that of said guide said abutment means including a slot formed in said body and a pin fixed relative to said housing and said guide and engaged in said slot, said slot having abutment surfaces engaging said pin.

2. The assembly defined in claim 1 wherein said head is spaced from said pivot by a distance such that said head lies substantially adjacent the other side of said housing in said horizontal position of said arm.

3. An arm assembly for an overhead projector, comprising:

an overhead projector housing having a pair of opposite sides;

a guide open at one of said sides and extending in said housing;

a pivot body displaceable in said guide and formed with a pivot;

a swingable arm articulated to said body at said pivot and swingable thereon between an upright operative position wherein said body and said pivot are fully received in said guide and recessed below said top of said housing, and a inoperative position wherein said arm lies along a top of said housing, said guide being shaped and dimensioned to lock said arm in said upright position relative to said body upon recessing of said pivot in said guide below said top;

a projection head on said arm at an end thereof remote from said pivot; and abutment means on said guide and said body defining end positions of said body in said guide, said abutment means including a slot formed in said body and a pin fixed relative to said housing and said guide and engaged in said slot, said slot having abutment surfaces engaging said pin.

4. The assembly defined in claim 3 wherein said head is spaced from said pivot by a distance such that said head lies substantially adjacent the other side of said housing in said horizontal position of said arm.

5. An arm assembly for an overhead projector, comprising an overhead projector housing;

a guide received in said housing and open at a surface of said housing;

a pivot body received in said guide and having external dimensions corresponding substantially to internal dimensions of said guide so that said pivot body is displaceable in said guide toward and away from said surface;

a pivot on said pivot body, said pivot body and said guide being dimensioned to enable said pivot and said body to be received entirely within said guide and recessed from said surface in said guide;

a swingable arm articulated to said body at said pivot and having a working position wherein said arm is substantially orthogonal to said surface and a rest position wherein said arm lies substantially along said surface; and a projection head on said arm at an end thereof remote from said pivot, said guide forming stops for said pivot body corresponding to said working and rest positions of said arm.

* * * * *